May 19, 1936.  C. M. LINDSAY  2,041,614
ELECTRICAL TESTING DEVICE
Filed July 30, 1932  2 Sheets-Sheet 1
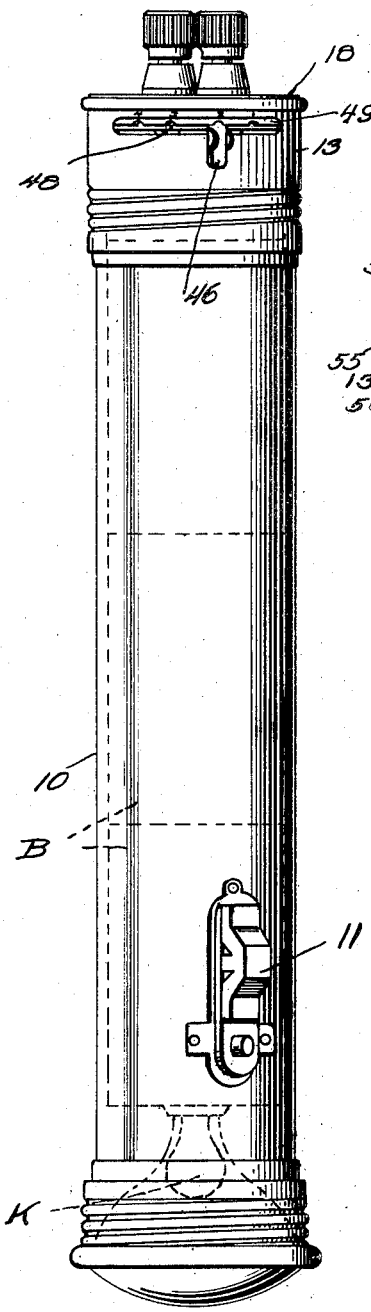
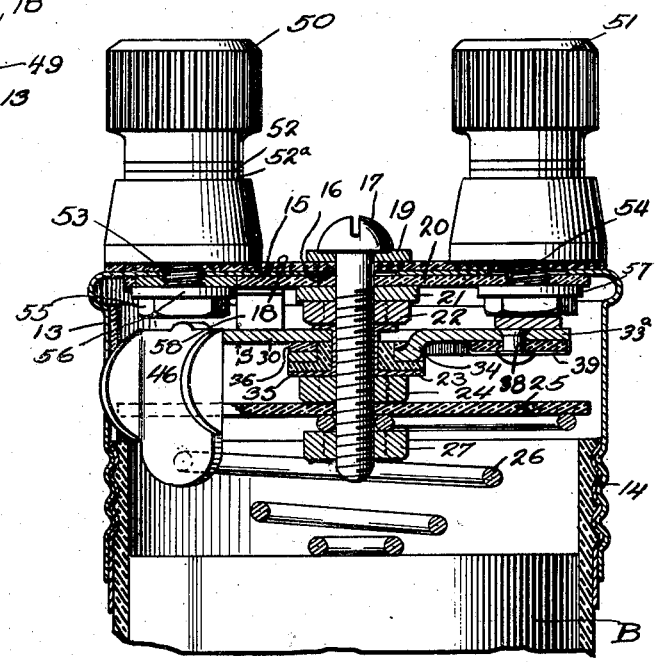
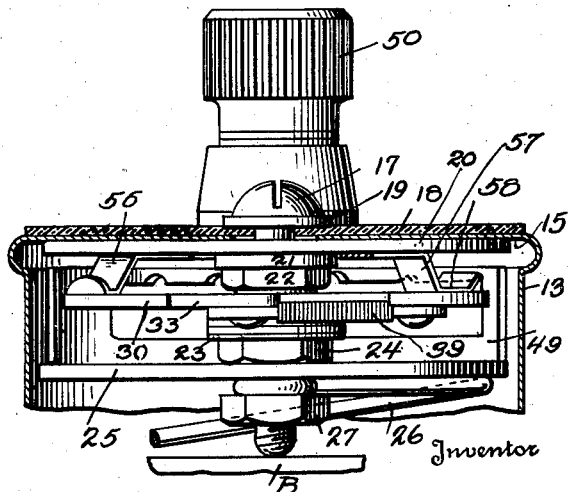
Inventor
C. M. LINDSAY
By Blair & Kilgore
Attorney May 19, 1936.  C. M. LINDSAY  2,041,614
ELECTRICAL TESTING DEVICE
Filed July 30, 1932   2 Sheets-Sheet 2
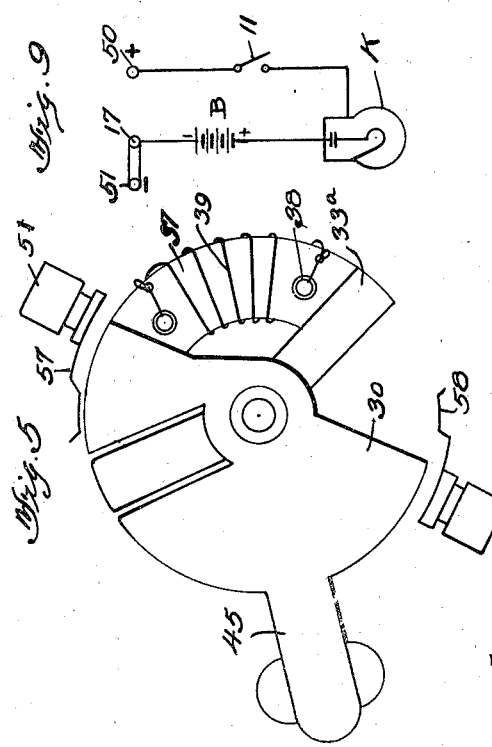
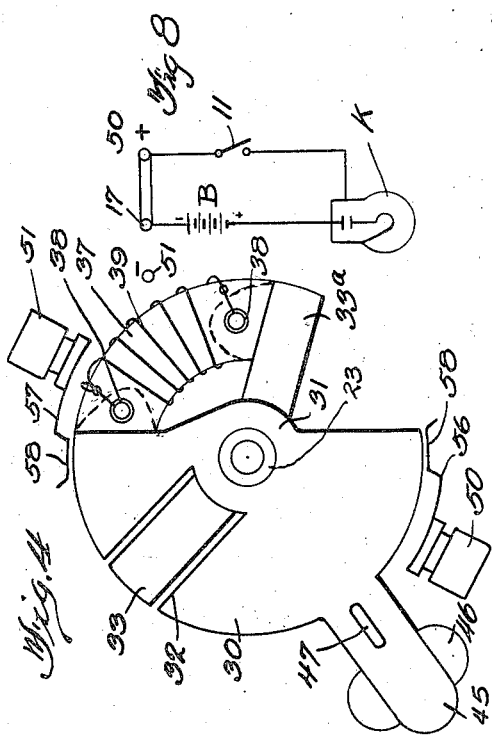
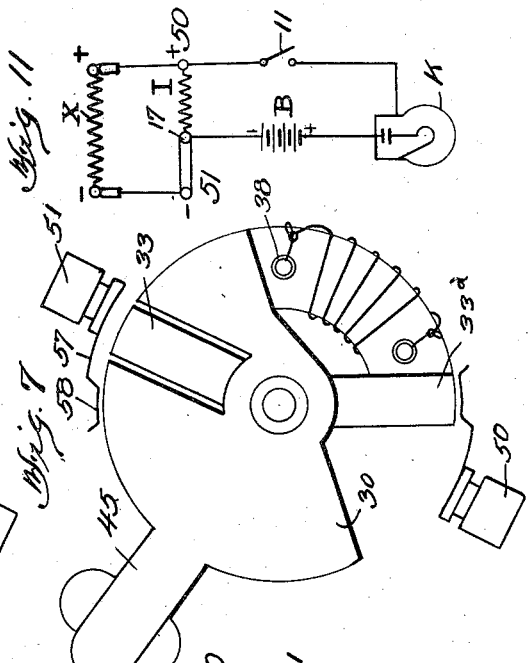
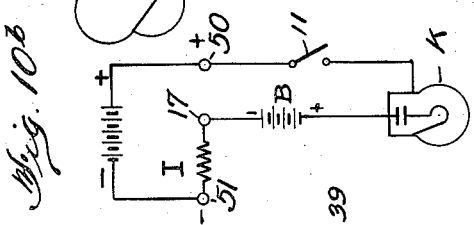
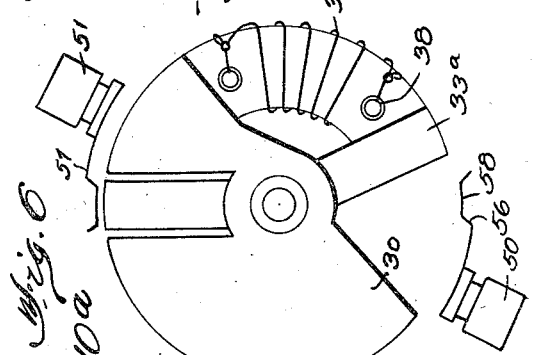
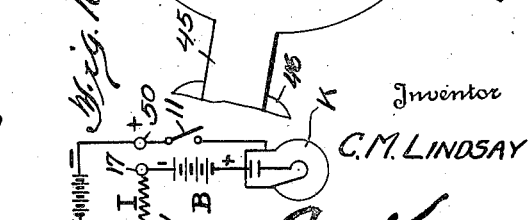
Inventor
C. M. LINDSAY
By
Attorney Patented May 19, 1936

2,041,614

UNITED STATES PATENT OFFICE 2,041,614

ELECTRICAL TESTING DEVICE

Charles M. Lindsay, Washington, D. C.

Application July 30, 1932, Serial No. 626,763

18 Claims. (Cl. 175—183)

This invention relates to electrical testing devices and more particularly to a combined flash light and electrical testing device capable of functioning as a flash light and of performing a plurality of electrical tests.

An object of my invention is the provision of a flash light capable of performing continuity or lamp in series tests; the provision of a flash light capable of testing "live" D. C. circuits up to fifteen volts without burning out the relatively low voltage bulb used in the flash light; the provision of a flash light for testing the polarity of circuits such as automobile or aircraft circuits; the provision of a flash light for performing continuity tests on circuits having resistance up to one hundred ohms; the provision of a combination flash light and electrical testing device capable of performing any one of a plurality of electrical tests upon proper adjustment of a circuit controlling member incorporated therewith; the provision of a novel flash light attachment unit rendering the flash light useful as an electrical testing device, in addition to its normal purpose as a flash light; the provision of an attachment unit for flash lights incorporating a switch assembly which is simple and economical in design, efficient and durable in use, and of rugged construction.

Other objects will be in part obvious from the annexed drawings and in part hereinafter indicated in the following analysis of my invention, in which reference is made to the accompanying drawings illustrating an embodiment of my idea.

In the drawings—

Fig. 1 is a side elevation of the attachment unit in accordance with my invention associated with the casing or shell of a conventional flash light;

Fig. 2 is an enlarged broken-away detail, partly in section, of the attachment unit;

Fig. 3 is a further broken-away detail;

Fig. 4 is a face view of the switch assembly and associated contacts diagrammatically illustrated, with the switch assembly in No. 1 position in relation to the contacts;

Fig. 5 is a similar view showing the switch assembly in No. 2 position;

Fig. 6 is a similar view of the switch assembly in No. 3 position;

Fig. 7 is a similar view showing the switch assembly in No. 4 position;

Figs. 8, 9, 10a and 10b are schematic representations of the switch and associated circuits corresponding to the switch positions illustrated in Figs. 4 through 7, respectively.

In the drawings, the reference character 10 indicates a flash light casing containing therein the conventional battery B of dry cells and bulb K, and provided with a light switch 11 adapted to complete a circuit from the battery through the bulb. In accordance with my invention, I substitute for the conventional end cap with which a flash light is provided, an attachment unit generally indicated in Figs. 1 and 2. By reference to Fig. 2, the said unit comprises a cap member 13 of generally cylindrical formation provided with threads 14, by which the unit may be threaded on to the casing 10 in the same manner as the conventional end cap. The end cap 13 of the unit is somewhat deeper than the conventional end cap to accommodate the switch assembly therein, to be hereinafter described.

The said cap 13 is provided with an end wall 15 provided with a central aperture 16, through which extends a threaded post 17 of conducting material, which serves in one of its functions to hold the attachment unit together. The aperture 16 of the end wall 15 is of greater diameter than the diameter of the post 17, and the post is further insulated from the cap by an outer insulating disc 18, from which the head of the post 17 is spaced by a metal washer 19, and by a second insulating disc 20 on the inner face of the wall 15, a nut 22 spaced by washer 21 being threaded on the post 17 to hold the insulating discs 18—20 in position.

A switch assembly, illustrated in face view in Figs. 4 through 7 is mounted on and rotates about the axis of the post 17, and is electrically connected thereto by means of a tubular metallic rivet 23 having end flanges spun over the elements forming the switch as will be hereinafter described. The switch element generally designated at S, Fig. 2, is arranged in position on post 17 by means of a nut 24, which also serves to properly space the switch assembly S in relation to cooperating contacts as will be hereinafter described, and at the same time spacing the switch assembly from an insulating disc 25 arranged on the post 17. The reference character 26 designates a spiral conducting spring of the type embodied in conventional flash light caps for making contact with the negative pole of the battery B. The said spring at its top portion is electrically connected to post 17, and is held against the insulating disc 25 by means of a nut 27, it being understood that the lower end of spring conductor 26 bears against the negative pole of the battery as aforesaid.

The switch assembly S comprises a metallic conducting disc 30, of partially circular formation and having a hub portion 31 suitably apertured for the reception of the shank portion of the conducting rivet 23, the upper flange of which is spun over the disc (see Fig. 2). The disc is cut out as at 32, and is further cut away throughout its region diametrically opposed to the cut-out portion 32 for approximately 160 degrees. An auxiliary switch element is associated with the disc 30, the said auxiliary element comprising strip or arm portions 33, 33a connected by a depressed hub portion 34 (see Fig. 2) similarly apertured for the reception of the shank of rivet 22, but insulated therefrom and from the disc 30 by means of fiber bushing and washer 35, 36, respectively. Arm 33 of the auxiliary switch element is spaced from the edges of the cut-out 32 of the switch disc 30 and is consequently electrically disconnected therefrom. The said arms 33, 33a are spaced approximately 160 degrees, the arm 33a carrying a sector 37 of insulating material, one end of which is riveted or otherwise secured as at 38 to an extension formed on arm 33a, the other end of the insulating strip being similarly secured to an extension formed on the switch disc 30. The said rivets 38 further anchor a resistance wire 39 to the insulating strip 37, while electrically connecting the switch arm 33a and the switch disc 30 through the resistance coil 39. The resistance of this coil, when testing devices used on not more than 15 volt circuits, may be 40 ohms. For use on constant potential telephone or like circuits of higher voltages, increase of the resistance of the coil 39 would be proportionately necessary in order to limit the flash light circuit current to .3 ampere.

The switch disc 30 carries an arm 45 of sufficient length as to extend beyond the cylindrical wall of the cap 13, the said arm being bent downwardly to form a finger piece 46. A bead or projection 47 is formed in the said arm 45 to engage in any one of a plurality of notches 48 formed in a suitable insert 49 (Figs. 1 and 3) of insulating material associated with the wall or shell of the cap.

Arranged on the end wall of the cap and exterior thereof are the terminals 50, 51, by which the flash light and attachment unit may be connected to an exterior circuit under test, of which 50 is the positive terminal and 51 the negative. These terminals are preferably marked either by symbols or colors to show their respective polarity. The said terminals are each provided with separable contacting elements 52, 52a electrically connected to the threaded studs 53, 54, of which 53 is associated with the positive terminal 50 and 54 with the negative terminal 51. The said studs extend through suitable apertures in the end wall 15 of the cap and the insulating discs 18, 20. The said stud 53 of the positive terminal contacts with the end wall 15, whereby the positive terminal is grounded to said end wall and the attachment cap, whereas the stud 54 of the negative terminal is insulated from the cap by reason of the stud extending through a large diameter aperture in the end wall 15.

Contacts are associated with each of the terminal studs 53, 54, the said contacts each comprising an arcuate strip of spring metal, one end of which is suitably apertured for arrangement on the studs 53, 54 and being respectively held thereto by nuts 55. Reference character 56 designates the positive contact and 57 the negative. The free end of each strip 56, 57 is bent downwardly to provide a flat contact area 58 adapted to resiliently and selectively contact with the disc 30 and arms 33, 33a of the switch assembly as the latter are rotated.

It has been heretofore indicated that the switch assembly S is manually rotatable about the axis of post 17 to four positions, of which the first or No. 1 permits the flash light to be used for its normal purpose, namely, as a flash light. The position of the switch with relation to the positive and negative terminals 50, 51 is illustrated in Fig. 4, it being understood that the lug 47 on the switch arm 45 is engaging in a notch 48 of the cap casing insulating strip 49, marked "No. 1" to indicate its No. 1 position. Fig. 8 illustrates diagrammatically the circuit arrangement when the switch is in its position as aforesaid. In such a position the contact areas 58 of the contacts 56, 57 associated with the respective terminals 50, 51 are in engagement with the switch disc 30, with the result that both terminals are short-circuited, and upon throwing of the switch 11, the flash light circuit is completed in the usual manner.

Referring to Fig. 5 and its associated circuit diagram, Fig. 9, the switch assembly S is here shown as having been moved to its No. 2 position. The circuit is open between the terminals 50, 51 and the flash light bulb K will not glow unless an external circuit is connected to the terminals 50, 51, either by connecting test leads between the said terminals and the external circuit under test, thus closing the flash light circuit through the external circuit, or by touching a good bulb or fuse to the switch lever 46 and cap shell 13. This arrangement provides a well known continuity or lamp in series test and can be used to test circuits whose resistances do not exceed 25 ohms. As many socket appliances are made within such a resistance range, it will be apparent that this test has wide field of utility.

In Fig. 6 and its associated circuit diagram, Figs. 10a and 10b, the switch assembly is shown in its No. 3 position, permitting the flash light to be used as a "test lamp" on "live" D. C. circuits up to 15 volts (where the resistance of coil 39 is 40 ohms) without burning out the 3.8 volt bulb used in a flash light. In such position of the switch assembly, the circuit is still open between the terminals 50, 51, but has the resistance I of the resistance coil 39 in series with the negative terminal 51 and the negative pole of the battery. Such a circuit provides a polarity test when used on circuits such as automobile (6 to 8 volts D. C.) or aircraft (12 to 15 volts D. C.) circuits. In its No. 3 position, it is to be noted that the voltage of the external or "live" circuit under test is necessary, in addition to the voltage of the flash light battery B, to make the filament of the light B glow. Thus, shorting of the circuit between the terminals 50, 51 does not produce a glow in the filament of the flash light bulb B, because the voltage of the flash light battery is not high enough to force through the resistance 39 and filament sufficient current to make the filament glow. When the terminals 50, 51 are connected to a "live" external D. C. circuit in such manner that the external circuit is in series with the flash light battery, the combined voltages are sufficient to force through the resistance 39 and the filament of the bulb a current that will make the filament glow, the degree of brilliancy depending on the value of the voltage in the external circuit.

When the terminals 50, 51 are connected to a live external D. C. circuit in such a manner that the external circuit is in parallel with the battery, as illustrated in Fig. 10b, the flow of current through the flash light is reversed, and 4.5 volts of the external circuit is lost in neutralizing the voltage of the flash light battery, the balance of the voltage of the external circuit being usually insufficient to heat the filament of the bulb to a bright glow. For example, on a 6 to 8 volt circuit, no glow is apparent where the 40 ohms resistance is used. The difference in the filament glow between the series and parallel connections thus makes possible the determination of polarity of the external circuit under test.

The usual difference between automobile and aircraft battery and generator voltages causes a noticeable variation in the brilliance in the glow of the lamp filament. This indicates whether the battery or the generator is "carrying the load" in the circuits under test. The terminals 50, 51 are preferably marked to show their polarity in connection with the flash light battery, and by suitably marking the test leads, one may learn if the external battery has been reversed, if the generator polarity has been reversed, or if any of the circuits connected to the battery or generator have been reversed. Where generator fields such as those used on aircraft lose their residual magnetism, they can be re-charged while running without risk of burning out the flash light bulb when the generator suddenly builds up its full voltage and kicks back at the flash light. Generator fields may be re-charged by connecting the positive terminal 50 of the unit to the positive terminal of the generator field circuit, and the negative terminal 51 to ground, with the switch assembly S in No. 3 position as aforesaid.

Referring to Figs. 7 and 11, wherein in Fig. 7 the switch assembly is shown in its No. 4 position, Fig. 11, illustrating diagrammatically the circuit, the resistance I of the resistance coil 39 is connected across or in parallel to the terminals 50, 51. This circuit makes possible the testing of circuits having a resistance up to 100 ohms, its purpose being to provide a continuity test similar to that provided with the switch assembly in its No. 2 position, but for circuits having higher resistance than can be tested on position No. 2, in which latter position the voltage of the flash light battery is insufficient to force a current of sufficient strength to make the filament of lamp K glow through more than 25 ohms resistance. Thus the switch assembly in the No. 4 position provides a means for relatively decreasing the resistance of the circuit to be tested. This is effected by connecting the resistance coil 39 across the terminals 50, 51 and connecting the said terminals to an external resistance or circuit to be tested. The joint resistance of this circuit, consisting of these two resistances in parallel (I plus X, Fig. 11) is less than the resistance of I or X alone. For example, if the resistance I equals 35 ohms and the resistance to be tested equals 35 ohms, their joint resistance when connected in parallel is 17.5 ohms. In automobile and aircraft electrical work, this test is useful in testing relays, field control resistances, generator field, and armature resistance, etc.

The above described attachment unit may be substituted for the usual end cap of the conventional types of flash lights now available and, in consequence, increases the functions of the flash light fourfold. The attachment unit is economical in construction, the switch assembly particularly being compact and rugged, with all operating parts being capable of manufacture by production stamping methods. Further, the switch is essentially long-lived and well fulfills the ends for which it is designed.

In the foregoing, a switch of the two-pole, multiple-throw type, in which the switch assembly is rotatable, and the poles fixed, has been described. However, a unit in which the poles are rotatable and the switch elements stationary may be substituted, and all such substitutions are comprehended within the scope of the present invention, when used in combination with a flash light used for electrical testing purposes, as aforesaid. Further, while I have illustrated and described an attachment unit to be substituted for a removable cap of the conventional flash light, it will be understood that the switch assembly of the present invention, and the plurality of testing circuits made possible by it, may be incorporated with flash lights of the closed end type. Accordingly, the term "casing" as used in some of the appended claims is to be interpreted in such manner as to comprehend the exterior shell of a flash light assembly, whether of the removable end cap or closed end type.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention and therefore such adaptations should and are intended to be comprehended within the meaning and range of equivalency of the following claims.

I claim:

1. A combined flash light and electrical testing device comprising a casing, a lamp and a battery contained therein, terminals associated with the casing and adapted to be connected to an external circuit under test, one terminal being grounded to the casing, and a two-pole multiple-throw switch assembly contained in the casing and electrically connected to one pole of the battery, the switch assembly in one position being operative to short-circuit the terminals, and in another position to electrically connect the other terminal with the said pole of the battery.

2. A combined flash light and electrical testing device comprising a casing, a lamp and a battery contained therein, positive and negative terminals mounted on the casing and adapted to be connected to an external circuit under test, and positive terminal being grounded to the casing, and a two pole multiple-throw switch assembly contained in the casing and electrically connected to the negative pole of the battery, the switch assembly including a resistance which may be connected in series or in parallel with the said terminals, the switch assembly in one position being operative to short-circuit the terminals and in another position to electrically connect the negative terminal with the negative pole of the battery through said resistance.

3. A combined flash light and electrical testing device comprising a casing, a lamp and a battery contained therein, positive and negative terminals mounted on the casing and adapted to be connected to an external circuit under test, the positive terminal being grounded to the casing, and a multiple-throw switch assembly contained in the casing and electrically connected to the negative pole of the battery, the switch assembly including a resistance which may be connected in series or in parallel with said terminals, the switch assembly in one position being operative to short-circuit the terminals, and in another position to electrically connect the negative terminal with the negative pole of the battery, and in a third position to interpose said resistance in series with the negative terminal and the battery.

4. A combined flash light and electrical testing device comprising a casing, a lamp and a battery contained therein, positive and negative terminals mounted on the casing and adapted to be connected to a circuit under test, the positive terminal being grounded to the casing, and a multiple-throw switch assembly contained in the casing and electrically connected to the negative pole of the battery, the switch assembly including a resistance which may be connected in series or in parallel with said terminals, the switch assembly in one position being operative to short-circuit the terminals, and in another position to electrically connect the negative terminal with the negative pole of the battery and to interpose said resistance across the terminals.

5. A combined flash light and electrical testing device comprising a casing, a lamp and a battery contained therein, positive and negative terminals mounted on the casing and adapted to be connected to a circuit under test, the positive terminal being grounded to the casing, and a multiple-throw switch assembly contained in the casing and electrically connected to the negative pole of the battery, the switch assembly including a resistance which may be connected in series or in parallel with said terminals, the switch assembly in one position being operative to short-circuit the terminals, and in another position to electrically connect the negative terminal and the negative pole of the battery through said resistance, and in another position to electrically connect said resistance in parallel with the terminals.

6. A combined flash light and electrical testing device comprising a casing, a lamp and a battery contained therein, positive and negative terminals mounted on the casing, the positive terminal being grounded to the casing, and a multiple-throw switch assembly contained in the casing and electrically connected to the negative pole of the battery, the switch assembly including a resistance which may be connected in series or in parallel with said terminals, the switch assembly in one position being operative to short-circuit the terminals, and in another position to electrically connect the negative terminal and the negative pole of the battery, and in a third position to electrically connect the negative terminal and said negative pole through said resistance, and in a fourth position to electrically connect said resistance in parallel with the terminals.

7. A combined flash light and electrical testing device comprising a casing, a lamp and a battery contained therein, an attachment unit including an end cap for securement to the casing, positive and negative terminals mounted on the cap and adapted to be connected to a circuit under test, the positive terminal being grounded to the cap, and a two pole multiple-throw switch assembly contained in the casing and electrically connected to the negative pole of the battery, the switch assembly in one position being operative to short-circuit the terminals, and in another position to electrically connect the negative terminal with the negative pole of the battery.

8. A combined flash light and electrical testing device comprising a casing, a lamp and a battery contained therein, an attachment unit including an end cap for securement to the casing, positive and negative terminals mounted on the cap and adapted to be connected to a circuit under test, the positive terminal being grounded to the cap, and a two pole multiple-throw switch assembly contained in the cap and electrically connected to the negative pole of the battery, the switch assembly including a resistance which may be connected in series or in parallel with said terminals, the switch assembly in one position being operative to short-circuit the terminals, and in another position to electrically connect the negative terminal with the negative pole of the battery through said resistance.

9. A combined flash light and electrical testing device comprising a casing, a lamp and a battery contained therein, an attachment unit including an end cap for securement to the casing, positive and negative terminals mounted on the cap and adapted to be connected to a circuit under test, the positive terminal being grounded to the cap, and a multiple-throw switch assembly contained in the cap and electrically connected to the negative pole of the battery, the switch assembly including a resistance which may be connected in series or in parallel with said terminals, the switch assembly in one position being operative to short-circuit the terminals, and in another position to electrically connect the negative terminal with said resistance in parallel with the terminals.

10. A combined flash light and electrical testing device comprising a casing, a lamp and a battery contained therein, an attachment unit including an end cap for securement to the casing, positive and negative terminals mounted on the cap and adapted to be connected to a circuit under test, the positive terminal being grounded to the cap, and a multiple-throw switch assembly contained in the cap and electrically connected to the negative pole of the battery, the switch assembly including a resistance which may be connected in series or in parallel with said terminals, the switch assembly in one position beng operative to short-circuit the terminals, and in another position to electrically connect the negative terminal and the negative pole of the battery through said resistance, and in another position to electrically connect said resistance in parallel with the terminals.

11. A combined flash light and electrical testing device comprising a casing, a lamp and a battery contained therein, an attachment unit including an end cap for securement to the casing, positive and negative terminals mounted on the cap and adapted to be connected to a circuit under test, the positive terminal being grounded to the cap, and a multiple-throw switch assembly contained in the cap and electrically connected to the negative pole of the battery, the switch assembly including a resistance which may be connected in series or in parallel with said terminals, the switch assembly in one position being operative to short-circuit the terminals, and in another position to electrically connect the negative terminal and the negative pole of the battery, and in a third position to electrically connect the negative terminal and said negative pole through said resistance; and in a fourth position to electrically connect said resistance in parallel with the terminals.

12. A combined flash light and electrical testing device comprising a casing, a lamp and a battery contained therein, such parts providing a flash light circuit, a resistance, means for connecting the resistance in parallel or series with the lamp and battery, and means for connecting said battery in parallel or series with an electrically energized or "live" external circuit under test through said resistance connected in series, whereby the voltage of the external circuit will oppose or assist the voltage of said battery, thus to give a difference in degree of illumination of the lamp and thereby to indicate the polarity of the external circuit.

13. A combined flash light and electrical testing device comprising a casing, a lamp and a battery contained therein, an attachment unit including an end cap for securement on said casing, a resistance, means for connecting the resistance in parallel or series with the lamp and battery, and means inclusive of said unit for connecting said battery in parallel or in series with an electrically energized or "live" external circuit under test through said resistance connected in series whereby the voltage of the external circuit will oppose or assist the voltage of said battery, thus to give a difference in degree of illumination of the lamp and thereby to indicate the polarity of the external circuit.

14. A combined flash light and electrical testing device comprising a casing, a lamp and a battery contained in the casing, such parts providing a flash light circuit, terminals in series with the circuit, and a multiple-throw switch including a resistance which may be connected in series or in parallel with said terminals, said switch being operative in one position to short-circuit the terminals; and in a second position to open the flash light circuit between the terminals whereby said circuit may be closed through an external circuit under test; and in a third position to connect said resistance in series with one of the terminals while leaving the flash light circuit open between the terminals, whereby the flash light circuit may be closed through an external live D. C. circuit; and in its fourth position to shunt said resistance across the terminals, thereby closing the flash light circuit through said resistance and causing an external circuit connected to the terminals to be in parallel with the resistance, thus to decrease the joint resistance of the resistances in parallel.

15. An attachment unit for flash lights comprising an end cap for securement to the casing of a flash light, terminals mounted on the cap for connection to an external circuit under test, one of the terminals being electrically connected to the cap, a post arranged in the cap and adapted to be electrically connected to a pole of a flash light battery, and a two-pole multiple-throw switch mounted for rotation on and electrically connected to said post and operative to selectively connect the post and the other terminal.

16. An attachment unit for flash lights comprising an end cap adapted for securement to the casing of a flash light, terminals mounted on the cap for connection to an external circuit under test, one of the terminals being electrically connected to the cap, a post arranged in the cap and adapted to be electrically connected to a pole of the flash light battery, a two-pole multiple-throw switch mounted for rotation on and electrically connected to said posts and operative to selectively connect the post and the other terminal, and a resistance unit mounted on and comprising one of the elements of said switch.

17. An attachment unit for flash lights comprising an end cap adapted for securement to the casing of a flash light, terminals mounted on the cap for connection to an external circuit under test, one of the terminals being electrically connected to the cap, a post arranged in the cap and adapted to be electrically connected to a pole of the flash light battery, a two-pole multiple-throw switch mounted for rotation on and electrically connected to said post and operative to selectively connect the post and the other terminal, and a resistance unit mounted on and comprising one of the elements of said switch, said switch being operable from the exterior of the cap.

18. A self-contained flash light and electrical testing device comprising a casing, a lamp and a battery contained therein, such parts providing a standard flash light assembly, a combined multiple-throw switch and resistance unit mounted in said casing, said unit in one of its positions being operative to connect the resistance in series relation with the lamp and battery, and means for connecting said battery in parallel or series with a separately energized external circuit under test whose voltage may range from less than to several times the voltage of said battery, said resistance being operative to limit the current flow through said lamp thereby to protect the lamp from burning out.

CHARLES M. LINDSAY.